United States Patent
Lin et al.

(10) Patent No.: US 7,783,770 B2
(45) Date of Patent: Aug. 24, 2010

(54) PACKET TRANSMITTING METHOD OF WIRELESS NETWORK

(75) Inventors: Tzu-Ming Lin, Taipei (TW); Shiao-Li Tsao, Taipei (TW); Chung-Huei Huang, Taipei County (TW); Wen-Tsuen Chen, Hsinchu (TW); Jhe-Ming Hsu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 806 days.

(21) Appl. No.: 11/308,166

(22) Filed: Mar. 9, 2006

(65) Prior Publication Data

US 2007/0101020 A1    May 3, 2007

(30) Foreign Application Priority Data

Oct. 28, 2005    (TW) .............................. 94137760 A

(51) Int. Cl.
| G06F 15/16 | (2006.01) |
| G06F 15/173 | (2006.01) |
| H04B 7/00 | (2006.01) |
| H04B 1/38 | (2006.01) |
| H04B 7/14 | (2006.01) |
| G08C 17/00 | (2006.01) |

(52) U.S. Cl. .................. 709/230; 709/238; 455/517; 455/574; 370/310; 370/311; 370/315

(58) Field of Classification Search ............... 709/230, 709/238–244; 455/517, 574; 370/310, 311, 370/315
See application file for complete search history.

(56) References Cited

U.S. PATENT DOCUMENTS

| 5,481,571 | A  | * | 1/1996 | Balachandran et al. ...... 375/347 |
| 6,567,416 | B1 | * | 5/2003 | Chuah ........................ 370/418 |
| 6,597,929 | B1 | * | 7/2003 | Han et al. .................... 455/574 |
| 6,678,267 | B1 | * | 1/2004 | Anandakumar et al. ..... 370/356 |
| 6,741,554 | B2 | * | 5/2004 | D'Amico et al. ............ 370/225 |
| 6,778,532 | B1 | * | 8/2004 | Akahane et al. ............. 370/392 |
| 7,424,007 | B2 | * | 9/2008 | Meier et al. ................. 370/352 |
| 7,525,927 | B2 | * | 4/2009 | Sato et al. .................... 370/254 |
| 2003/0120802 | A1 | * | 6/2003 | Kohno ........................ 709/237 |
| 2003/0133458 | A1 | * | 7/2003 | Sato et al. ................. 370/395.6 |
| 2003/0235184 | A1 | * | 12/2003 | Dorenbosch et al. ........ 370/352 |
| 2004/0017790 | A1 | * | 1/2004 | del Prado et al. ............ 370/333 |
| 2004/0165574 | A1 | * | 8/2004 | Kakumaru et al. .......... 370/349 |
| 2006/0047845 | A1 | * | 3/2006 | Whited et al. ............... 709/231 |
| 2007/0041378 | A1 | * | 2/2007 | Ihm et al. .................... 370/389 |

FOREIGN PATENT DOCUMENTS

CN    1647440    7/2005

OTHER PUBLICATIONS

"Solutions to Performance Problems in VoIP Over a 802.11 Wireless LAN", jointly authored by Wang, et al., IEEE Transactions on Vehicular Technology vol. 54, No. 1, pp. 366-384, Jan. 2005.

(Continued)

*Primary Examiner*—Wing F Chan
*Assistant Examiner*—David Yi
(74) *Attorney, Agent, or Firm*—Jianq Chyun IP Office

(57) ABSTRACT

A packet transmitting method of wireless network is provided. The packet transmitting method determines whether the packet to be transmitted is a real-time packet or not, and, when the packet is a real-time packet, a re-transmission mechanism of the packet is determined to be ON or OFF according to the transmission status of the wireless network itself.

13 Claims, 10 Drawing Sheets

OTHER PUBLICATIONS

"Power management for VoIP over IEEE 802.11 WLAN," jointly authored by Chen, et al., IEEE Communications Society, WCNC 2004, pp. 1648-1653.

Power saving gateways for real-time voice handset support in IEEE 802.11 wireless LANs, jointly authored by Wang, et al., IEEE Communications Society, pp. 164-169, 2004.

* cited by examiner

PACKET TRANSMITTING METHOD OF WIRELESS NETWORK

CROSS-REFERENCE TO RELATED APPLICATION

This application claims the priority benefit of Taiwan application serial no. 94137760, filed on Oct. 28, 2005. All disclosure of the Taiwan application is incorporated herein by reference.

BACKGROUND OF THE INVENTION

1. Field of Invention

The present invention relates to a packet transmitting method. More particularly, the present invention relates to a packet transmitting method of wireless network.

2. Description of Related Art

In recent years, the wireless network systems, such as the WLAN, WMAN, have been developed, and the network is sequentially established to provide service. Among others, the packet voice and video are regarded as one of the most important application services on the wireless network system. However, how to provide the real-time communication services on the wireless network remains a challenge. For example, most of the wireless handheld devices are powered by batteries, so the power consumption issue needs to be overcome. Furthermore, most of the video and audio data of the real-time communication system are generated in specific time periods, and most of them are small packets, which significantly affects the usage of bandwidth of the wireless network system.

Yet the wireless network system is mostly designed to transmit the data packet, rather than optimize the transmission of the real-time packet. The features of the real-time packet are not fully used in the design of the wireless network system. For example, most real-time communication allows some packet loss, so using additional bandwidth to achieve the reliable transmission is not the priority when transmitting the voice packet. Therefore, if the used capacity of the network bandwidth can be expanded and the power consumption of the handheld device can be improved, it will benefit the development of the real-time communication service over the wireless network environment.

The operation flow of Standard 802.11 is shown in FIG. 1. When the Mobile Station (MS) transmits the packets, if the wireless medium is being used by other MS, the MS will wait until the wireless medium is not used, and wait for a DCF Interframe Space (DIFS), then begin to count down the contention window (CW). When the countdown reaches 0, the MS begins to transmit the control packets, such as the RTS, CTS, or the data or fragmentation packets (such as Frg#1 and Frg#2). When a correct packet is received at the receiving end, an ACK packet will be sent to the transmitting end after a Short Interframe Space (SIFS).

Referring to FIG. 2, it is a systematic architectural view of a wireless network using real-time communication service. As shown in FIG. 2, at one end of the wireless network, one or more wireless network devices 202, 204 are connected with the cable network end through the wireless network access point 210 to access the internet 230. Taking the uplink real-time packet as an example, the packet is firstly transmitted to a router 220 in the same local area network through the wireless network access point 210, and then the router 220 transmits the packet to the correspondent node 240 at the other end over the internet network, wherein the correspondent node 240 communicates in real-time with the internet network. While taking the downlink real-time packet as an example, the packet is firstly transmitted to the router 220 over the internet 230, and then the router 220 transmits the packet to the wireless network device 202 or 204 over the wireless network access point 210.

Based upon the conventional arts, when the wireless network environment is used to transmit the real-time packet, the simplest way is to keep the network card on permanently, so that the packet can always be transmitted and received. Whereas, the network card of such a design still consumes power even if it does not transmit packets. A method for reducing the power consumption is to keep the wireless network in a sleeping mode, and then activate the wireless network devices to transmit packets when the packet needs to be transmitted. Such method is usually called as PS-Poll transmission mechanism. Referring to FIG. 3, it is a schematic view illustrating the packet timing diagram and the corresponding power consumption when the real-time packet is transmitted over the wireless network by the PS-Poll mechanism. As shown in FIG. 3, the wireless network devices can transmit the uplink and downlink real-time packets after being linked and registered. After the uplink real-time packet is sent, the wireless network devices is still required to wait for the ACK packet of the wireless network access point (AP) since it should determine whether the packet needs to be re-transmitted or not. Moreover, when the wireless network device is in a power-saving mode, for the downlink real-time packet, the PS-Poll is used to fetch the packet stored in the buffer region of the wireless network access point. Similarly, in order to facilitate the wireless network access point to determine whether the packet should be re-transmitted or not, the wireless network devices is further required to send the ACK packet to the wireless network access point, so as to confirm whether the packet is received correctly. Thus, for the purpose of achieving a reliable transmission, it is inevitable to use two SIFSs and two ACK packets additionally, and therefore the power consumption and used capacity of the network bandwidth cannot be fully improved.

If the Unscheduled-Automatic Power Saving Delivery (U-APSD) mechanism defined by the 802.11e is used to transmit the real-time packet, the power consumption of the PS-Poll transmission mechanism can be further improved. Referring to FIG. 4, it is a schematic view illustrating the packet timing diagram and corresponding power consumption when the real-time packet is transmitted over the wireless network by the U-APSD mechanism. Compared with FIG. 3, the mechanism shown in FIG. 4 is similar to that of FIG. 3, except that a PS-Poll packet is omitted, and is not described in detail herein.

To achieve a preferable power-saving effect, many related medium control techniques are further developed in addition to the Power-saving Delivery mechanism, including the techniques of reducing the sync signals and space between the MS and the wireless network access point; alleviating the problems of hidden terminal, reducing the interference and collision and the probability of packet re-transmission; observing the current transmission status of the wireless medium and reducing the additional transmitting and receiving actions; predicting the time point at which next packet is transmitted and received, based on data statistics or forecasts; analyzing the long-term or short-term transmission for the packet to control the transmitting and receiving, so as to avoid the additional power consumption; modifying the transmission mechanism of the standard CSMA/CA; reducing the control overhead in transmitting the fragmentation packets; adding the protective mechanism and reducing the probability of collision in the transmission procedure of the long packet;

adding or modifying the feedback message to help adjust the transmitting power; or reducing the re-transmission of the packet data units or the ACK packet. Furthermore, there are some other power-saving techniques, such as the technique of reducing the measurement in the sleep mode; the technique of reducing the power consumption in receiving the short control packet, the power-saving mechanism related to the QOS, the technique using Time Division Multiple Access (TDMA), the technique using Packet Reservation Multiple Access (PRMA), and the technique of reducing the transmission of the control message of the networks.

However, many of the above power-saving mechanisms modify the transmission mechanism of 802.11, and are not compatible with the standard. Some of the above mechanisms cause different power-saving effects due to the limitation of the measurement or evaluation results. Some cause power consumption of another part for the purpose of saving the power consumption of a certain part. And some cause other effects, such as a low transmission throughput or network off-line, in order to achieve the power-saving effect.

In other words, the present techniques for saving power still have drawbacks. Especially, some of the power-saving mechanisms may cause inconvenience in usage due to the incompatibility with the standard. Therefore, the conventional art cannot overcome the problems encountered in the real-time communication effectively.

SUMMARY OF THE INVENTION

In view of the above, an object of the present invention is to provide a packet transmitting method of wireless network. This packet transmitting method is to transmit the packet of the real-time communication service by the multicast mechanism defined by Standard 802.11. As for compatibility, this method is compatible with the standard and not limited to the effects of the evaluation and measurement accuracy. Also, the method is used to save power without increasing the power consumption of other parts, and even more, it does not have other effects on the mobile device. According to the power-saving technique of the present invention, the power-saving effect can be achieved, and also the capacity usage for the entire network is expanded as well.

In order to achieve the objects described above, the present invention provides a packet transmitting method of wireless network. The packet transmitting method determines whether the packet to be transmitted is a real-time packet or not, and, when the packet is a real-time packet, a re-transmission mechanism of the packet is determined to be ON or OFF according to the transmission status of the wireless network itself.

In an embodiment of the present invention, a multicast MAC address shared by the wireless access node and the wireless network device is further set. Such multicast MAC address can be obtained by message exchange between the wireless access node and the wireless network device, or by converting the unicast network address of the wireless network device.

In an embodiment of the present invention, when the multicast MAC address is obtained by converting the unicast network address of the wireless network device, the standard conversion procedure for converting the unicast network address into the unicast MAC address is firstly conducted. Then, the specific field of the network address in the specification standard is converted into the multicast MAC address for use, so that the unicast MAC address is changed into the multicast MAC address.

In another embodiment of the present invention, after the packet to be transmitted is determined to be a real-time packet, but before the packet re-transmission mechanism is determined to be ON or OFF, multiple real-time packets can be integrated into one downlink packet, and the packet transmission is conducted in a transmission unit of the downlink packet.

In one embodiment of the present invention, when multiple real-time packets are integrated into a downlink packet as described above, for each real-time packet added into the downlink packet, a sub-header is generated according to specific bytes used in converting the unicast network address into the multicast MAC address and the length of the corresponding MAC packet data units. Then the sub-header and the corresponding MAC packet are combined into a sub-packet. After forming multiple sub-packets, every sub-packet is linked and combined by way of sub-header interfacing. Finally, a standard multicast MAC header is added before the results from linking and combining the sub-packets, so that the downlink packet described below is generated.

According to the present invention, the real-time packet and non-real time packet are detected and separated, and the re-transmission mechanism of the real-time packet is on/off dynamically for the real-time packet. Therefore, in accordance with the present network transmission protocol, the bandwidth used for detecting re-transmission of the real-time packet and the re-transmission of packet are reduced effectively, and therefore the used capacity of the network bandwidth of the wireless network system is improved and the power consumption problem of the handheld device is resolved.

In order to the make the aforementioned and other objects, features and advantages of the present invention comprehensible, a preferred embodiment accompanied with figures is described in detail below.

DESCRIPTION OF EMBODIMENTS

The present invention will be illustrated in WLAN hereinafter; however, the present invention is also applicable to various wireless network systems, but not limited to the wireless local area network. An embodiment will be illustrated to explain in detail the specific technical means for realizing the re-transmission mechanism of separating a real-time packet and a non-real time packet by, for example, dynamically corresponding and assigning the multicast/unicast addresses, and the effect of the present invention can also be achieved through other dynamic ON/OFF packet re-transmission mechanism.

Figure 1:
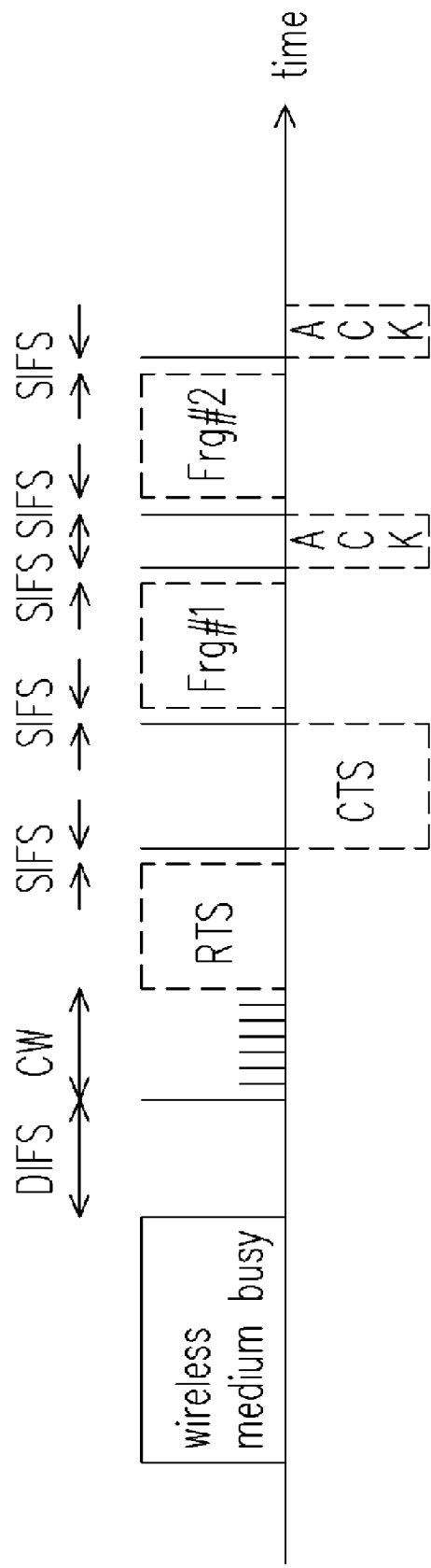
FIG. 1 is an data transmission systematic view of the standard 802.11.
Figure 2:
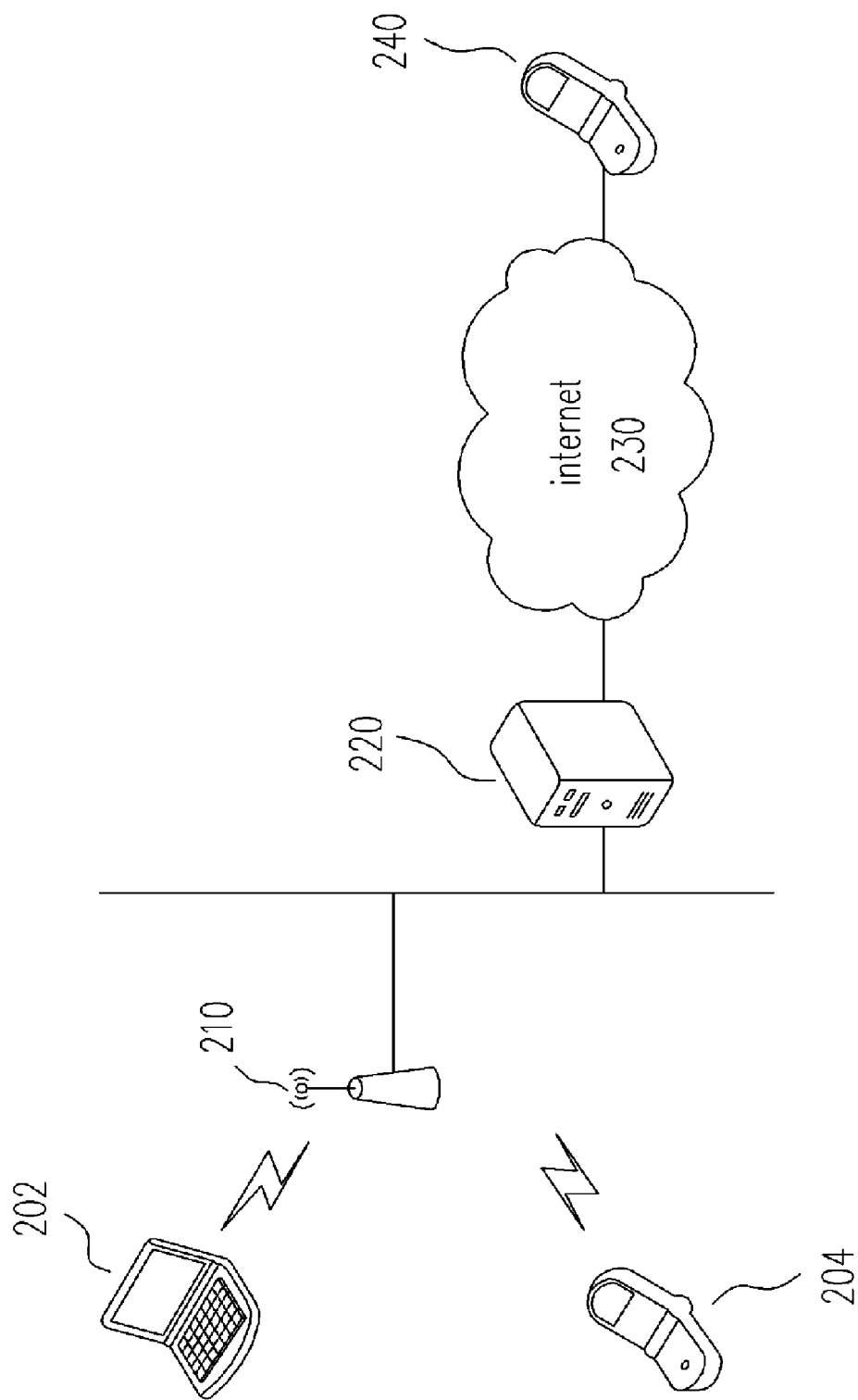
FIG. 2 is a systematic architectural view of a wireless network using the real-time communication service.
Figure 3:
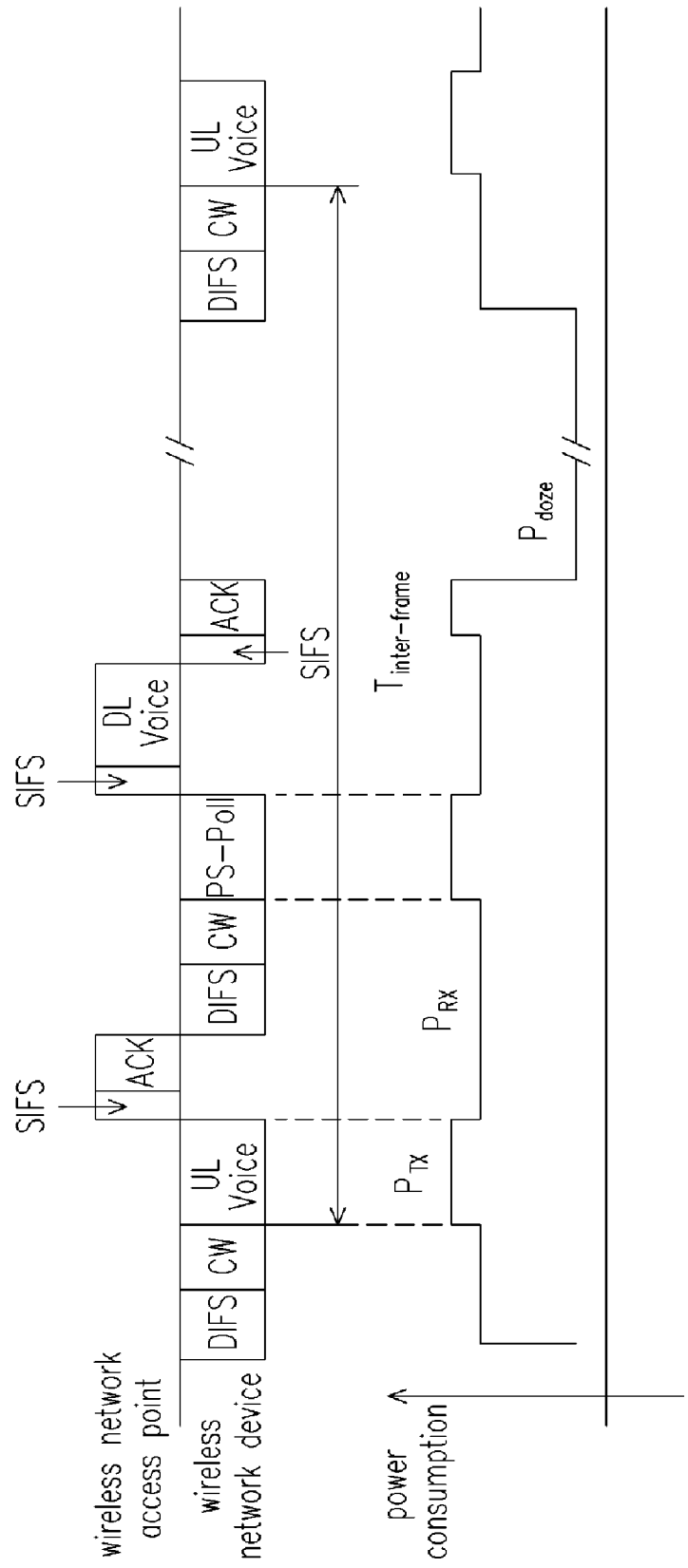
FIG. 3 is a schematic view illustrating the packet timing diagram and corresponding power consumption when the real-time packet is transmitted over the wireless network by the PS-Poll mechanism.
Figure 4:
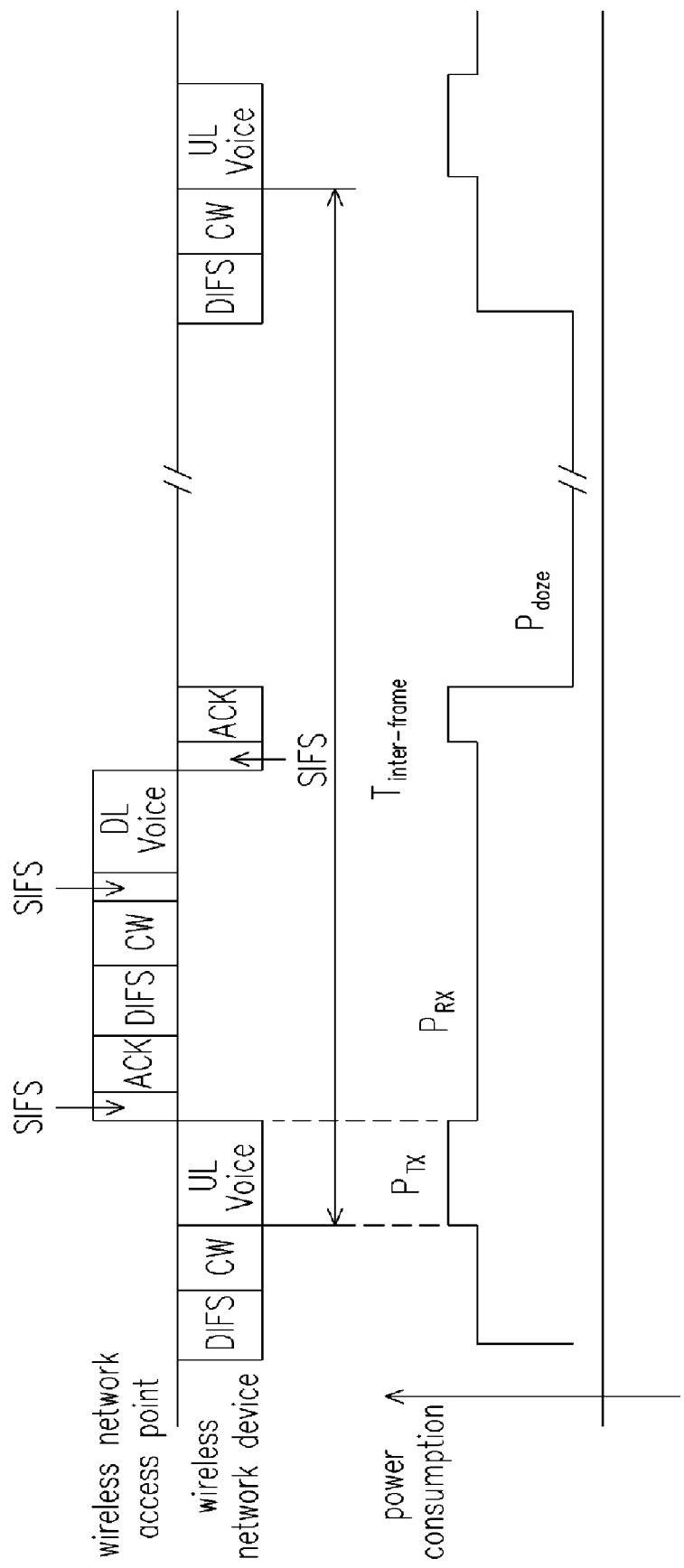
FIG. 4 is a schematic view illustrating the packet timing diagram and corresponding power consumption when the real-time packet is transmitted over the wireless network by the U-APSD mechanism.

Refer to the network architecture shown in FIG. 2 for the following illustration. When the present invention is applied to the PS-Poll mechanism, the wireless network device 202 or 204 firstly executes the related association and register operations on the wireless network access device 210 and the router 220, and establishes a real-time communication connection to the node 240 which provides real-time communication services at the other terminal. Through these actions, the wireless network access device 210 starts to support the dynamic correspondence and assignment of the multicast/unicast addresses for the wireless network device 202 or 204, and provides the necessary parameters for the router 220 to discriminate the real-time packet and the non-real time packet. And then, the wireless network device 202 or 204 determines whether the multicast address is used for the delivery of the uplink and downlink real-time packets according to the current communication quality and the packet loss condition, so as to turn off the re-transmission mechanism.

In an IPv4 embodiment of the present invention, when the related association and register operations are executed between the wireless network device 202 or 204 and the wireless network access point 210 and the router 220, the wireless network device 202 or 204 must first create a legal multicast address (represented by the multicast MAC address MAC MA herein). The multicast address can be created by integrating the standard prefix of the multicast address MAC MA to the last 23 bits of the unicast address (represented by unicast MAC address MAC STA herein) of the wireless network device 202 or 204. Of course, other techniques for creating the multicast address can also be applied to the present invention. And then, the wireless network device 202 or 204 sends an association request to the wireless network access point 210. In this association request, the wireless network device 202 or 204 carries the multicast address MAC MA as a parameter, and the wireless network access point 210 updates the parameter into its current association list upon receiving the request. Alternatively, the multicast addresses MAC MA can be created directly by the wireless network access point 210 according to the unicast address MAC STA of the wireless network device 202 or 204, thus additional messages or data exchange operations can be eliminated.

In order to enable the router 210 to use the multicast address of the wireless network device to transmit the downlink real-time packet transmitted to the wireless network device 202 or 204, the wireless network device 202 or 204 needs to apply the Address Resolution Protocol (ARP) to update the ARP table of the router 210. At this time, the network (IP) address of the wireless network device 202 or 204 corresponds to the multicast address MAC MA and the unicast address MAC STA simultaneously. Finally, a simple method for the router 210 to discriminate the real-time packet and the non-real time packet can be conducted through the port numbers. That is, through the Session Description Protocol (SDP) message carried in the request for establishing a real-time communication connection between the wireless network device 202 or 204 and the real-time communication node 240 at the other terminal, the router 210 can record the port number used in the real-time communication connection for the subsequent discrimination on whether it is a real-time packet or not. In addition, the following can also be used as the basis for determining whether the packet is a real-time packet or not, such as, whether the packet uses a specific address header, or whether the packet is based on a specific way of exchanging messages (such as the SDP described above).

After performing the preliminary operations for the packet delivery described above, the actual delivery of the packet can be started. According to the present invention, the packet delivery at this time can be easily divided into the real-time packet and the non-real time packet. In the present embodiment, the non-real time packet is not specifically processed; however, it does not mean changes cannot be made to the delivery of these non-real time packets, which will not be repeated herein as it is well known to those skilled in the art. On the other hand, for the real-time packet, a re-transmission mechanism of the packet can be determined to be ON or OFF according to the transmission status of the wireless network in the present invention. For example, the wireless network device 202 or 204 can cut the delivery action on the time axis into several periods by the time length t, and determines the current situation of the network through the parameters, such as RSSI (Received Signal Strength Indication) or PLR (Packet Loss Rate) provided by the upper network layer. In other words, the RSSI can be confirmed every other predetermined time period t by the wireless network device 202, and the re-transmission mechanism of the real-time packet is turned OFF when the RSSI is greater than a predetermined value in the present invention. Alternatively, the PLR is confirmed every other predetermined time period t, and the re-transmission mechanism of the real-time packet is turned ON when the PLR is greater than a predetermined value.

In an embodiment of the present invention, the controlling of the re-transmission mechanism of the real-time packets to be ON or OFF is effected by controlling the real-time packets to be multicast packets or not. According to the current network delivery specifications, the multicast packet will not be provided with the packet re-transmission mechanism, and thus the total time for transmitting the real-time packets will be reduced if the real-time packets can be converted from unicast to multicast. Unlike the other conversion mechanisms, where the packets have to be converted from unicast to multicast, according to the present invention, the headers of the MAC addresses are changed as the packets remaining in the unicast status on the IP layer enter the link layer, so that the MAC addresses of the packets can be converted to multicast.

Figure 5:
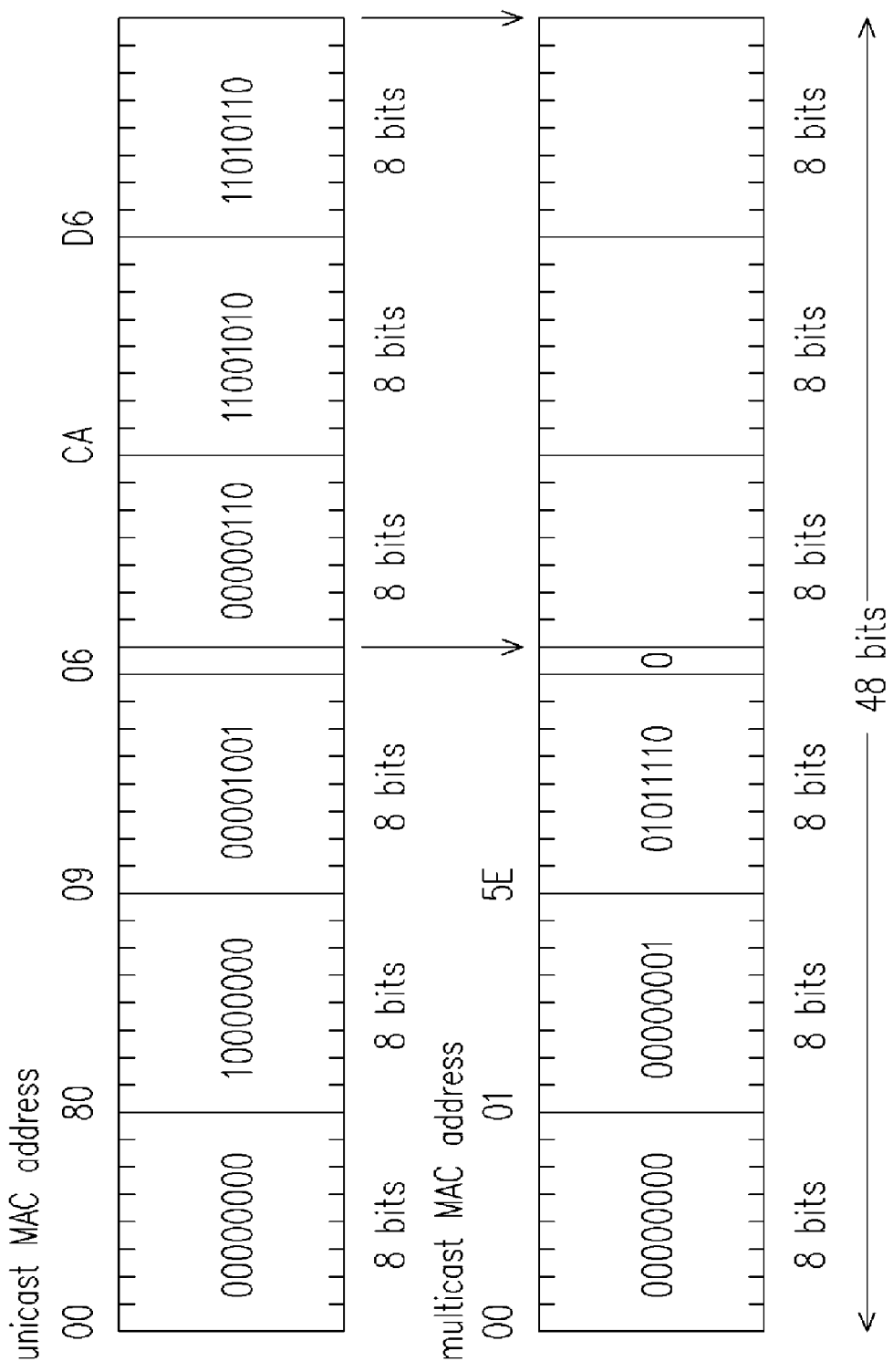
FIG. 5 is a schematic view of the unicast MAC address and the multicast MAC address according to the Ipv4 network specification standard.

Referring to FIG. 5, it is a schematic view of the unicast MAC address and the multicast MAC address according to the IPv4 network specification standard. As shown in FIG. 5, regarding the current network delivery specification, the difference between the unicast MAC address and the multicast MAC address resides in that they have different values in the front ends of the addresses. Therefore, the unicast MAC address can be converted into the multicast MAC address, simply by converting the contents of the specific field of the unicast MAC address in the specification standard (in the IPv4 specification standard, referring to the first 25 bits in the MAC address; while in the IPv6 specification standard, referring to the first 16 bits in the MAC address) into the contents of the specific field of multicast MAC address. At this point, after a real-time packet with a unicast network (IP) address is obtained, a standard conversion procedure for converting the unicast network address into a unicast MAC address may be performed in advance (wherein the standard conversion procedures may vary according to different network standards, but the conversion is well known to those skilled in the art, and thus will not be repeated herein).

After the unicast MAC address is obtained through conversion, the standard contents of the specific field of the unicast MAC address meeting the network specification standard are converted into the standard contents of the specific field of the multicast MAC as shown in FIG. 5, so that the unicast MAC address is converted into the multicast MAC address. Finally, in order to prevent the unicast real-time packet from being mistaken for the multicast real-time packet during encoding, the predetermined multicast address group is used in the present embodiment; i.e. if the MAC address belongs to this group, the packet is regarded as a real-time packet; otherwise, the packet is regarded as a general multicast packet.

Figure 6:
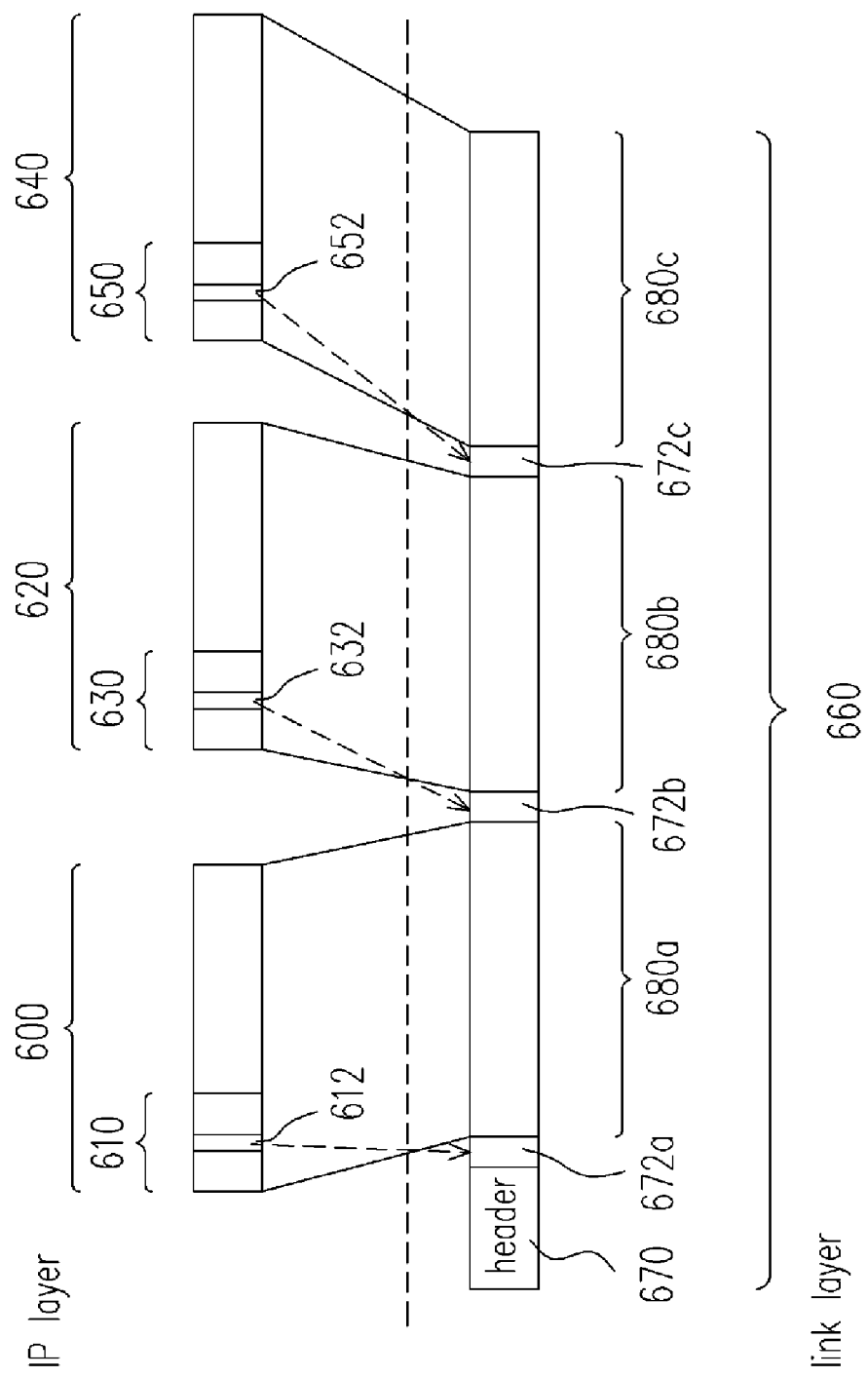
FIG. 6 is a schematic view of the packet architecture of a downlink packet integrated by multiple real-time packets having unicast IP addresses.

Additionally, the real-time packets of the same property are further integrated together into a downlink packet, and then the packet transmission is performed with the downlink packet as a transmission unit. Said property comprises power consumption, quality of service (QOS), safety, transmission delay or delay jitter and the like. Referring to FIG. 6, it is a schematic view of packet architecture of a downlink packet 660 integrated by multiple real-time packets 600, 620 and 640 having unicast IP addresses. New sub-headers 672*a*, 672*b* and 672*c* are generated by utilizing the specific bytes 612, 632 and 652 dropping during converting the unicast IP address into the multicast MAC address plus the length of the subsequent MAC packet data units (680*a*, 680*b* and 680*c*), and then said new sub-headers and the MAC packet data units 680*a*, 680*b* and 680*c* are combined into individual sub-packets. That is, 672*a* and 680*a* are combined into a sub-packet, 672*b* and 680*b* are combined into a sub-packet, and 672*c* and 680*c* are combined into a sub-packet. And then, multiple sub-packets are combined into a long packet by interfacing the sub-headers by linkage, and then a downlink packet 660 is formed by adding a standard multicast MAC header 670.

Figure 7A:
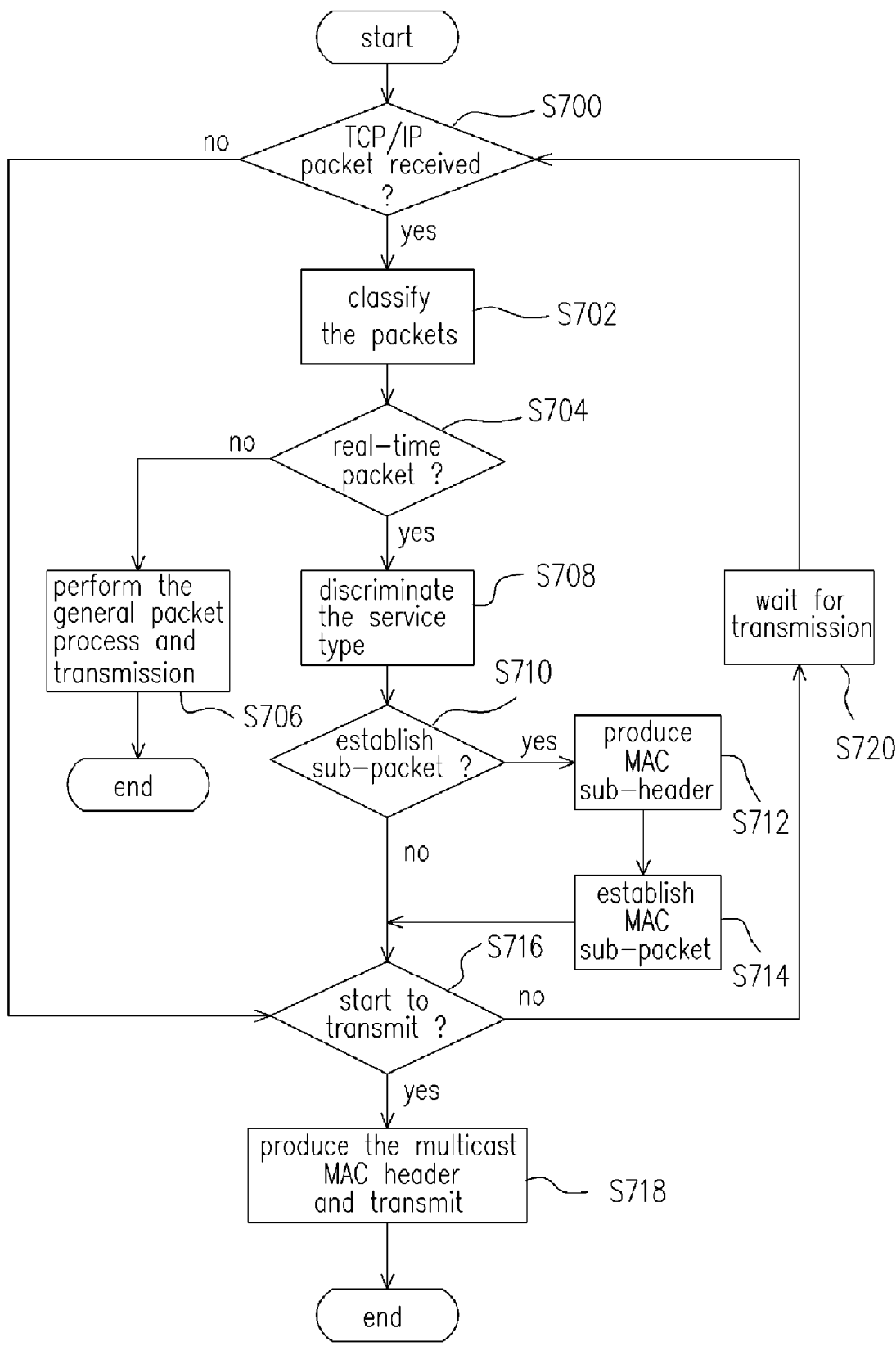
FIG. 7A is an operation flow chart when the router receives data from a node according to an embodiment of the present invention.

In the process described above, the contents of the sub-headers may vary according to the IP versions, and meanwhile the length of the sub-packets may vary according to the length of the actual MAC packet data units. Other data packets can also be operated according to the original conversion and transmission method without being affected. With such a technique, multiple packets of the same property including power consumption, QOS, safety and the like can be linked into a single MAC packet for transmission, so that the additional overhead during the transmission can be reduced; and on the other hand, the transmission competition between the packets can also be reduced. The mechanism uses the same type of transmission method for the same type of packets, such as transmission delay, delay jitter, or the like, and operates in association with algorithm.

Where downlink packets are used, in the network environment as shown in FIG. 2, the operations of the device MS 202 or 204 and the router 220 can be modified slightly so that corresponding operation support can be realized. Referring to FIG. 7A, it is an operation flow chart when the router 220 or other network devices with the layer three processing capacity receives data from the node 240 according to an embodiment of the present invention. When the device receives the TCP/IP packet transmitted from the external network (S700), it is first determined whether the packet is a real-time packet (S702, S704). If not, the general process and transmission are used for the transmission (S706); if yes, it is determined which service type the packet belongs to (S708). And then it is determined whether a sub-packet is needed to be generated depending on whether the packets belong to the service type of the same type (S710). If a sub-packet is desired, a corresponding sub-header is generated through the conversion procedure (S712), and then the packet data unit is added to generate the sub-packet (S714). If the sub-packet is not desired or the sub-packet has already been generated, the algorithm is used to determine whether the transmission time arrives (S716). If not, the sub-packet is put into the schedule or the queue to wait for the transmission time (S720); if the transmission time arrives, a new multicast MAC header belonging to the type of the service type is generated, and the sub-packets in the schedule or queue are linked into a single packet for transmission (S718).

It is noted that although the multicast MAC header is generated in step S718, it can be generated after step S708, S710, S712 or S714. The modification can be easily made by those skilled in the art and therefore is not described here.

Figure 7B:
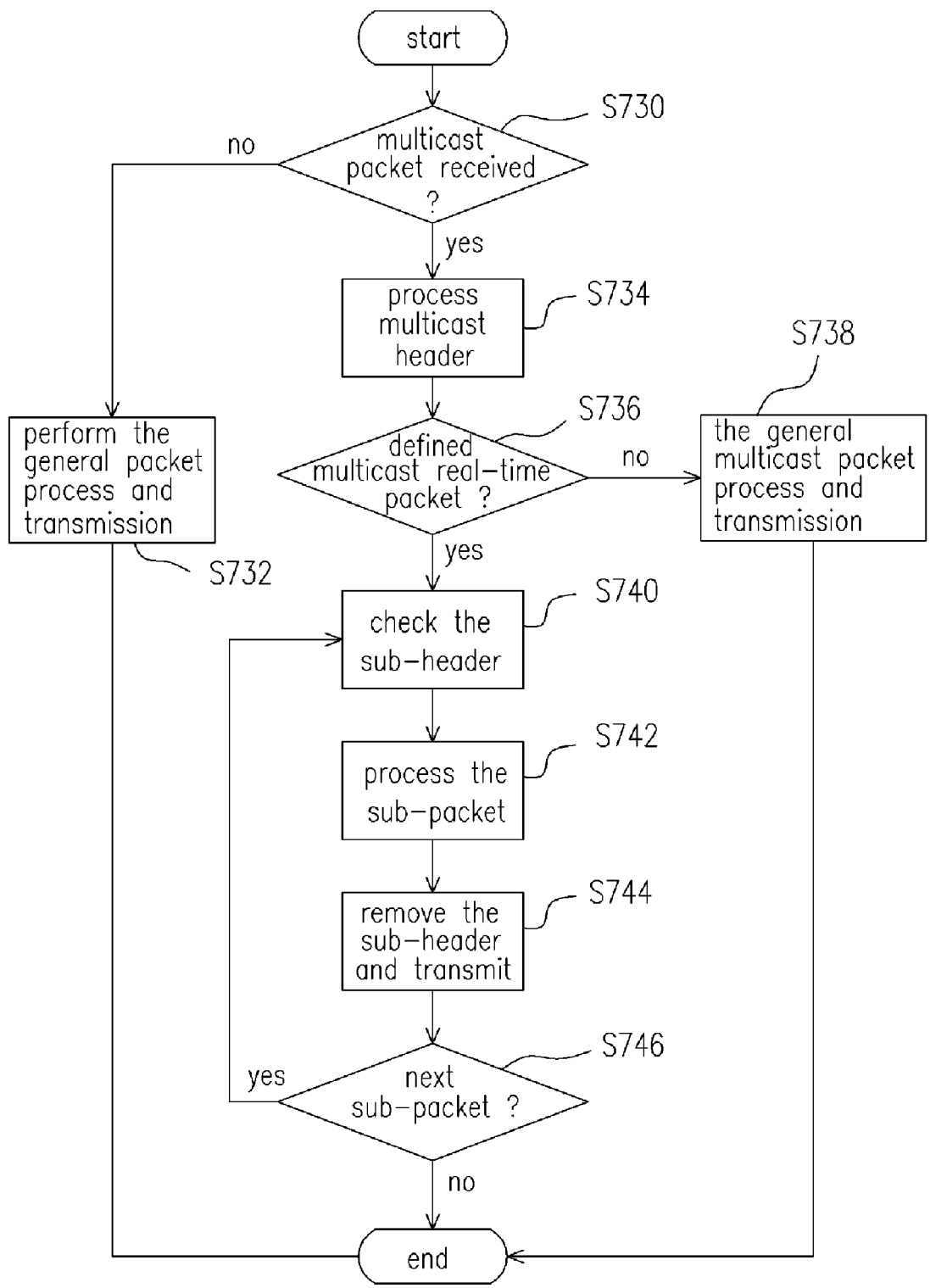
FIG. 7B is an operation flow chart when the router receives data from the wireless network access point according to an embodiment of the present invention.

Next, referring to FIG. 7B, it is an operation flow chart when the router 220 or other network devices with the layer three processing capacity receives data from the wireless network access point 210 according to an embodiment of the present invention. In the present embodiment, when the packet is received from the wireless network access point 210, the determination processing is conducted to the header of the packet (S730). If it is determined to be a non-multicast packet, the packet is processed by the standard method (S732); if it is determined to be a multicast packet, the header of the multicast packet is processed (S734), and it is determined whether the packet belongs to the predefined real-time packet (S736). If it is determined not to be the predefined real-time packet in S736, the packet is processed by the general multicast method (S738); if it is determined to be the predefined real-time packet, the sub-header of the packet is interpreted (S740), and then the sub-packet data unit is processed (S742), and the sub-header is removed and the packet is transmitted to the upper layer for processing (S744). Finally, it is checked if there are next sub-packets or not (S746). If yes, the same processing is executed (S740-S746); if not, the procedure is ended.

Figure 8A:
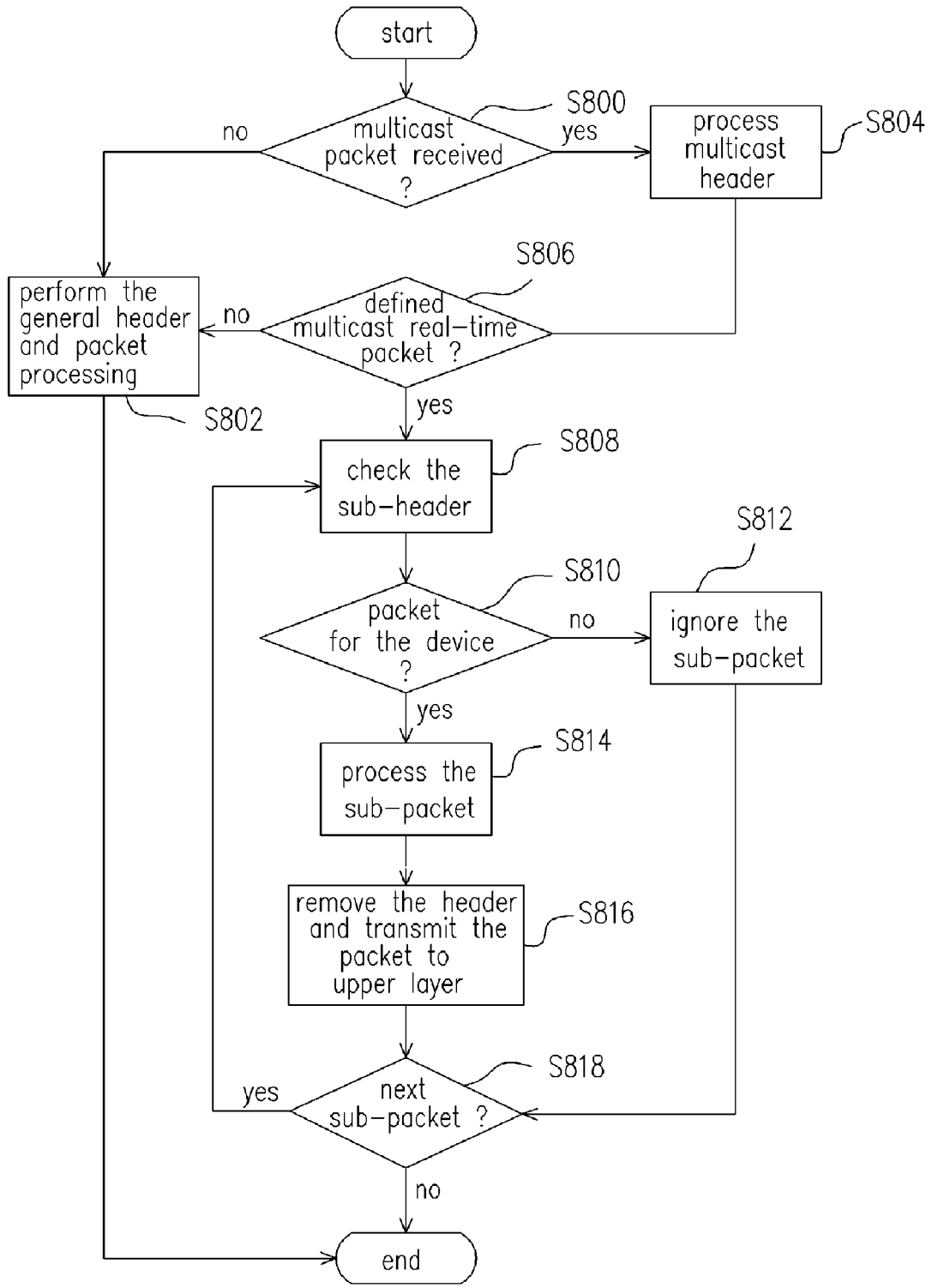
FIG. 8A is an operation flow chart when the wireless network device receives data from the wireless network access point according to an embodiment of the present invention.

And then referring to FIG. 8A, it is an operation flow chart when the wireless network device 202 or 204 receives data from the wireless network access point 210 according to an embodiment of the present invention. In the present embodiment, when receiving the packet transmitted from the wireless network access point 210 over the external network, the MS 202 or 204 determines whether the packet is a multicast packet or not (S800) firstly. If not, the packet is processed according to the standard method (S802); if yes, the header is processed (S804). And then, it is determined whether the packet belongs to the predefined real-time packet or not (S736). If not, the packet is processed according to the standard method (S802); if yes, the packet is processed subsequently. Firstly, the sub-header is checked to determine whether the sub-packets belong to itself (S808, S810). If not, the sub-packets is ignored (S812), and then the next sub-packets are checked (S818); if yes, the sub-packets belong to itself, the sub-packets is processed (S814), and after the sub-header is removed and the data units of the sub-packets are interpreted, the sub-packets are transmitted to the upper layer for processing (S816). And then, the next sub-packets are checked (S818) until the whole multicast packets are interpreted.

Figure 8B:
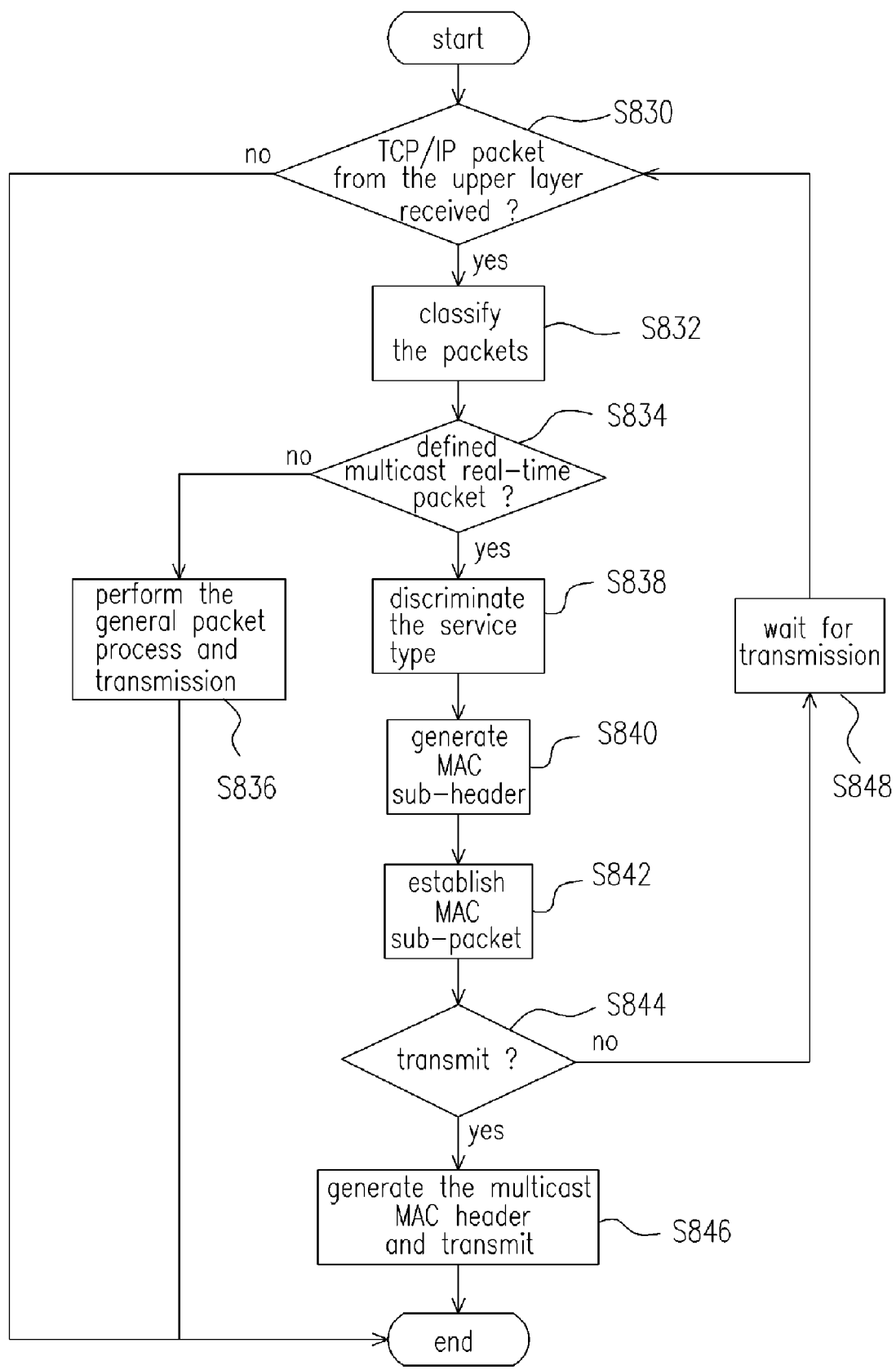
FIG. 8B is an operation flow chart when the wireless network device transmits the data to the wireless network access point according to an embodiment of the present invention.

And then referring to FIG. 8B, it is an operation flow chart when the wireless network device 202 or 204 transmits the data to the wireless network access point 210 according to an embodiment of the present invention. When the data of the wireless network device needs to be transmitted (Step S830), the TCP/IP packets are classified (S832) firstly. If it is not the predefined real-time packet, the packet is processed and transmitted according to the general data process principle (S834, S836); and if it is the predefined real-time packet, it is determined which kind of specific service type the packet belongs to (S834, S838), then the sub-header corresponding to the service type is generated (S840), and then the packet data unit is added to form a MAC sub-packet (S842). And finally, it is calculated whether the packet is to be transmitted or not according to the schedule or algorithm (S844). If yes, the packet is transmitted according to the multicast transmission principle (S846); if it is before the transmission time, the sub-packet is put into the schedule or queue to wait for the transmission time (S848).

It is noted that although the multicast MAC header is generated in step S846, it can be generated after step S834, S838, S840 or S842. The modification can be easily made by those skilled in the art and therefore is not described here.

It is apparent from the above descriptions that in present invention, the packet re-transmission is determined to be ON or OFF by actively controlling the real-time packet to be a multicast packet or not. One of the methods to control the real-time packet to be a multicast packet or not can be by changing the MAC address as described above. If the method provided by the present invention is applied to the PS-Poll transmission mechanism, since the multicast address is used in the transmission of the downlink and uplink real-time packets, the packet re-transmission can be deactivated to reduce the waiting time of the ACK packet. The wireless network device can reduce both the power consumption and improve the utilization of the network bandwidth through eliminating two SIFSs and two ACK packets. Similarly, the method provided by the present invention can also be applied to other power-saving methods of the real-time communication, such as the U-APSD. Since the multicast address can also be used in the delivery of the downlink and uplink real-time packets, the re-transmission mechanism can be turned off to reduce the waiting time of the ACK packet, and through omitting two SIFSs and two ACK packets, the power consumption can be reduced and the utilization of the network bandwidth also can be improved. As shown in the experiment results, the use rate of the network bandwidth can be increased by 40%, and meanwhile the power consumption can be reduced by 40%.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A packet transmitting method of wireless network, comprising a plurality of network devices, wherein the method comprises:
    determining, at one of the plurality of network devices, whether a packet to be transmitted is a real-time packet or not;
    determining, at the one of the plurality of network devices, whether a re-transmission mechanism of the packet is to be ON or OFF according to a transmission status of the wireless network when the packet is a real-time packet;
    wherein the step of determining, at the one of the plurality of network devices, whether the re-transmission mechanism of the packet is to be ON or OFF according to the transmission status of the wireless network comprises:
    confirming, at the one of the plurality of network devices, a RSSI (Received Signal Strength Indication) every other predetermined time period; and turning off, at the one of the plurality of network devices, the re-transmission mechanism of the packet when the RSSI is greater than a predetermined value; and
    confirming, at the one of the plurality of network devices, a PLR (Packet Loss Rate) every other predetermined time period; and turning on, at the one of the plurality of network devices, the re-transmission mechanism of the packet when the PLR is greater than a predetermined value.

2. The packet transmitting method of wireless network as claimed in claim 1, further comprising setting, at the one of the plurality of network devices, a multicast MAC address shared by the plurality of network devices.

3. The packet transmitting method of wireless network as claimed in claim 2, wherein the multicast MAC address is set through message exchange between the plurality of network devices.

4. The packet transmitting method of wireless network as claimed in claim 2, wherein the multicast MAC address is obtained, at the one of the plurality of network devices, by converting a unicast network address of the wireless network device.

5. The packet transmitting method of wireless network as claimed in claim 4, wherein the step of converting, at the one of the plurality of network devices, the unicast network address of the wireless network device to obtain the multicast MAC address comprises:
    conducting, at the one of the plurality of network devices, a standard conversion procedure for converting the unicast network address into a unicast MAC address firstly; and converting, at the one of the plurality of network devices, the contents of the specific field of the unicast MAC address into the contents of the specific field of multicast MAC address, so as to change the unicast MAC address into a multicast MAC address.

6. The packet transmitting method of wireless network as claimed in claim 1, wherein a multicast MAC address is used, at the one of the plurality of network devices, as a destination MAC address of the real-time packet, achieving the effect of turning off the re-transmission mechanism.

7. The packet transmitting method of wireless network as claimed in claim 1, wherein a unicast MAC address is used, at the one of the plurality of network devices, as a destination MAC address of the real-time packet, achieving the effect of turning on the re-transmission mechanism.

8. The packet transmitting method of wireless network as claimed in claim 1, wherein a unicast MAC address is used, at the one of the plurality of network devices, as a destination MAC address of the non-real time packet, achieving the effect of turning on the re-transmission mechanism.

9. The packet transmitting method of wireless network as claimed in claim 1, wherein the step of determining, at the one of the plurality of network devices, whether the packet is to be transmitted is a real-time packet or not comprises:
    recording, at the one of the plurality of network devices, a network port number, an address header and a specific way of exchanging message used in setting a real-time communication; and determining, at the one of the plurality of network devices, the packet to be a real-time packet as long as one of the following situations occurs:

the port number used in receiving and transmitting the packet is the network port number; the packet employs the address header; or the packet is received and transmitted in the specific way of exchanging message.

10. The packet transmitting method of wireless network as claimed in claim 1, further comprising the following steps after determining whether the packet to be transmitted is a real-time packet and before determining whether the re-transmission mechanism of the packet is ON or OFF:

integrating, at the one of the plurality of network devices, multiple downlink real-time packets into a downlink packet; and transmitting, at the one of the plurality of network devices, the packet in a transmission unit of the downlink packet.

11. The packet transmitting method of wireless network as claimed in claim 10, wherein the step of integrating multiple downlink real-time packets into the downlink packet comprises:

generating a sub-header according to specific bytes used in the conversion from the downlink unicast network address to the multicast MAC address and the length of the corresponding MAC packet data units;

combining, at the one of the plurality of network devices, the sub-header and the corresponding MAC packet into a sub-packet;

linking, at the one of the plurality of network devices, every sub-packet in a way of sub-header interfacing; and adding, at the one of the plurality of network devices, a standard multicast MAC header before the results from linking and combining each of the sub-packets, so as to generate the downlink packet.

12. The packet transmitting method of wireless network as claimed in claim 10, wherein when multiple downlink real-time packets are integrated, at the one of the plurality of network devices, into the downlink packet, the downlink real-time packets having a same property are integrated together.

13. The packet transmitting method of wireless network as claimed in claim 12, wherein the same property is the one selected from the group consisting of power consumption, quality of service, safety, transmission delay and delay jitter.

* * * * *